US008645600B2

(12) United States Patent
Caporale et al.

(10) Patent No.: US 8,645,600 B2
(45) Date of Patent: Feb. 4, 2014

(54) CONFIGURING EXPANSION COMPONENT INTERCONNECT ('ECI') PHYSICAL FUNCTIONS ON AN ECI DEVICE IN A COMPUTING SYSTEM

(75) Inventors: Patrick L. Caporale, Cary, NC (US); Josep Cors, Rochester, MN (US); Michael R. Turner, Carnation, WA (US); Theodore B. Vojnovich, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 13/293,806

(22) Filed: Nov. 10, 2011

(65) Prior Publication Data
US 2013/0124770 A1 May 16, 2013

(51) Int. Cl.
*G06F 13/10* (2006.01)
*G06F 9/44* (2006.01)

(52) U.S. Cl.
CPC .................................. *G06F 9/4415* (2013.01)
USPC ............................................. 710/104; 713/1

(58) Field of Classification Search
USPC ......................................................... 710/104
See application file for complete search history.

(56) References Cited

U.S. PATENT DOCUMENTS

| 5,857,086 | A | 1/1999 | Horan et al. |
| 7,529,860 | B2 | 5/2009 | Freimuth et al. |
| 7,577,832 | B2 * | 8/2009 | Wisecup et al. ................. 713/2 |
| 7,590,883 | B2 | 9/2009 | Engle et al. |
| 7,617,377 | B2 | 11/2009 | Moertl et al. |
| 7,743,189 | B2 * | 6/2010 | Brown et al. ................. 710/104 |
| 7,793,089 | B2 * | 9/2010 | Leigh et al. ....................... 713/1 |
| 7,836,238 | B2 | 11/2010 | Freimuth et al. |
| 7,865,628 | B2 | 1/2011 | Konno et al. |
| 7,934,033 | B2 * | 4/2011 | Malwankar et al. .......... 710/104 |
| 7,979,592 | B1 * | 7/2011 | Pettey et al. ....................... 710/3 |
| 8,078,865 | B2 * | 12/2011 | Brumley et al. .............. 713/100 |
| 8,103,810 | B2 * | 1/2012 | Brown et al. ................... 710/62 |
| 8,200,955 | B2 * | 6/2012 | Wisecup et al. ................... 713/2 |
| 8,208,396 | B2 * | 6/2012 | Eisenhauer et al. .......... 370/252 |
| 8,271,707 | B2 * | 9/2012 | Fan et al. ....................... 710/104 |
| 8,359,415 | B2 * | 1/2013 | Brown et al. ................... 710/62 |
| 2008/0040526 | A1 * | 2/2008 | Suzuki et al. ................. 710/302 |
| 2008/0222338 | A1 * | 9/2008 | Balasubramanian et al. 710/306 |

(Continued)

OTHER PUBLICATIONS

Anonymous, "Method to Preboot Creation of Partitions in LPAR Systems", IP.com Prior Art Database, IPCOM000202955D, Jan. 12, 2011, pp. 2-3. USA.
Hewlett-Packard, "HP Virtual Connect Flex-10 Technology: Convergence With FlexFabric Components", Technology Brief, TC101106TB, Nov. 2010, pp. 1-19, Hewlett-Packard Development Company L.P. USA.

Primary Examiner — Ryan Stiglic
(74) Attorney, Agent, or Firm — H. Barrett Spraggins; Katherine S. Brown; Biggers Kennedy Lenart Spraggins LLP

(57) ABSTRACT

Configuring expansion component interconnect ('ECI') physical functions on an ECI device in a computing system, including: configuring by an ECI device configuration manager, during run-time of the computing system, vital product data to include an ECI physical function configuration, wherein the ECI physical function configuration comprises data describing a type of ECI physical function; retrieving by an ECI device configuration manager, upon a subsequent startup of the computing system, the ECI physical function configuration from the vital product data; and configuring, by an ECI device configuration manager, a physical function of the ECI device to carry out the type of ECI physical function described in the ECI physical function configuration.

18 Claims, 3 Drawing Sheets

(56) References Cited

U.S. PATENT DOCUMENTS

| | | |
|---|---|---|
| 2009/0133016 A1 | 5/2009 | Brown et al. |
| 2009/0144731 A1 | 6/2009 | Brown et al. |
| 2009/0248947 A1* | 10/2009 | Malwankar et al. .......... 710/316 |
| 2009/0276551 A1* | 11/2009 | Brown et al. ................... 710/72 |
| 2009/0276775 A1* | 11/2009 | Brown et al. .................. 718/100 |
| 2009/0307481 A1* | 12/2009 | Wisecup et al. ................... 713/2 |
| 2011/0016235 A1* | 1/2011 | Brinkmann et al. .............. 710/8 |
| 2011/0055433 A1* | 3/2011 | Kishore et al. .................... 710/9 |
| 2011/0161651 A1* | 6/2011 | Leigh et al. ....................... 713/2 |

* cited by examiner

CONFIGURING EXPANSION COMPONENT INTERCONNECT ('ECI') PHYSICAL FUNCTIONS ON AN ECI DEVICE IN A COMPUTING SYSTEM

BACKGROUND OF THE INVENTION

1. Field of the Invention

The field of the invention is data processing, or, more specifically, methods, apparatus, and products for configuring expansion component interconnect ('ECI') physical functions on an ECI device in a computing system.

2. Description of Related Art

Modern computing systems include a variety of different components that make up the computing system. Expansion cards are common components that contribute to the overall composition of a computing system. Expansion cards can carry out physical functions. Physical functions are typically burned into an expansion card when the expansion card is manufactured, with no ability to alter which physical function is carried out on a particular port of the expansion card after the expansion card has been manufactured.

SUMMARY OF THE INVENTION

Methods, apparatus, and products for configuring expansion component interconnect ('ECI') physical functions on an ECI device in a computing system, including: configuring by an ECI device configuration manager, during run-time of the computing system, vital product data to include an ECI physical function configuration, wherein the ECI physical function configuration comprises data describing a type of ECI physical function; retrieving by an ECI device configuration manager, upon a subsequent startup of the computing system, the ECI physical function configuration from the vital product data; and configuring, by an ECI device configuration manager, a physical function of the ECI device to carry out the type of ECI physical function described in the ECI physical function configuration.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
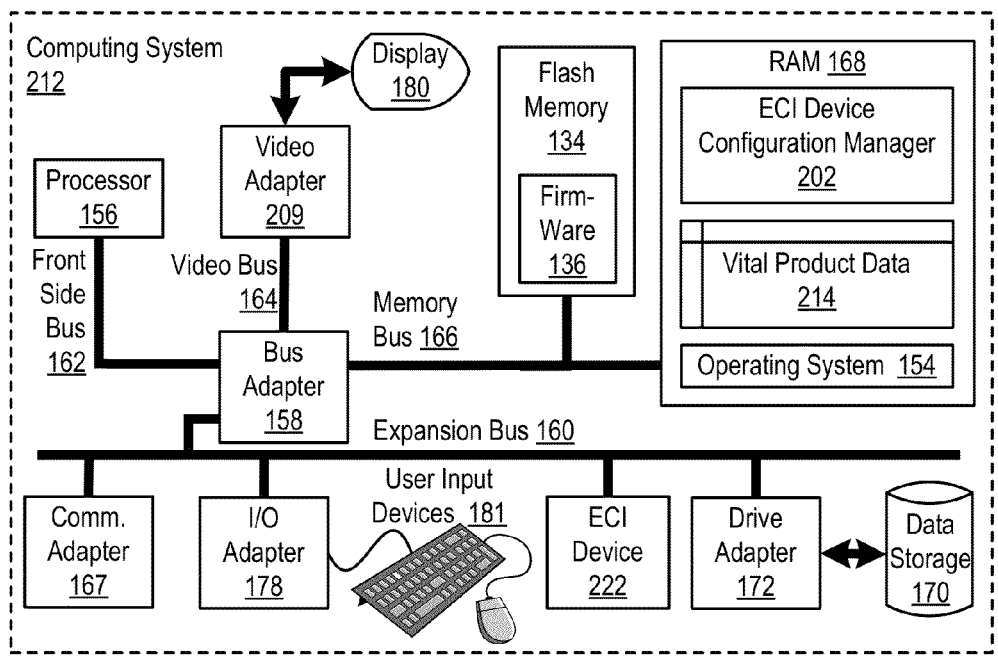
FIG. 1 sets forth a block diagram of an example computing system useful in configuring expansion component interconnect ('ECI') physical functions on an ECI device according to embodiments of the present invention.

Example methods, apparatus, and products for configuring expansion component interconnect ('ECI') physical functions on an ECI device in a computing system in accordance with the present invention are described with reference to the accompanying drawings, beginning with FIG. 1. Configuring ECI physical functions on an ECI device (222) in a computing system (212) in accordance with the present invention is generally implemented with computers, that is, with automated computing machinery. For further explanation, therefore, FIG. 1 sets forth a block diagram of an example computing system (212) useful in configuring ECI physical functions on an ECI device (222) according to embodiments of the present invention. The computing system (212) of FIG. 1 includes at least one computer processor (156) or 'CPU' as well as random access memory (168) ('RAM') which is connected through a high speed memory bus (166) and bus adapter (158) to processor (156) and to other components of the computing system (212).

The example computing system (212) of FIG. 1 includes an ECI device (222). In the example of FIG. 1, the ECI device (222) is an expansion card that is inserted into the computing system (212) to expand the functionality of the computing system (212). The ECI device (222) may be inserted into the computing system (212), for example, by inserting the ECI device (222) into an expansion slot of the computing system (212). Such an expansion slot may include electrical contacts that can be used to establish an electrical connection between the ECI device (222) and a motherboard or a backplane of the computing system (212). In the example of FIG. 1, an ECI device (222) may adhere to a predefined standard for expansion cards. For example, the ECI device (222) of FIG. 1 may be embodied as a Peripheral Component Interconnect Express ('PCIe') expansion card, a Peripheral Component Interconnect ('PCI') expansion card, a Peripheral Component Interconnect Extended ('PCI-X') expansion card, and so on.

In the example of FIG. 1, each ECI device (222) may be configured to support one or more ECI physical functions. A physical function is similar to any traditional expansion card function. A physical function is discovered, managed, and manipulated like any other expansion card. A physical function also has full configuration resources, a completely independent set of registers, and so on such that it is possible to control an expansion card via the physical functions. The ECI physical functions are distinguished from virtual functions, which do not have direct access to the underlying hardware resources. In the example of FIG. 1, such physical functions may enable the ECI device (222) to operate in a variety of ways such as, for example, as an Internet Protocol ('IP') adapter, as a Small Computer System Interface ('SCSI') adapter, as a Fibre Channel over Ethernet ('FCoE') adapter, and so on.

Stored in RAM (168) of the computing system (212) is an ECI device configuration manager (202), a module of computer program instructions improved for configuring ECI physical functions on an ECI device (222) in a computing system (212) according to embodiments of the present invention. In the example of FIG. 1, the ECI device configuration manager (202) can configure, during run-time of the computing system (212), vital product data (214) to include an ECI physical function configuration. Vital product data (214) may include, for example, a part number for the ECI device (222), a serial number for the ECI device (222), details related to the hardware configuration of the ECI device (222), levels of the hardware on the ECI device (222), firmware and software component levels on the ECI device (222), and so on. In the example of FIG. 1, vital product data (214) is depicted as residing within RAM (168) of the computing system. Readers will appreciate that vital product data (214) may also be stored in non-volatile memory on the ECI device (222) itself, or elsewhere within the computing system (168).

In the example of FIG. 1, an ECI physical function configuration is embodied as data describing the configuration of a particular ECI physical function on the ECI device (222). An ECI physical function configuration may include, for example, data identifying the particular port that a particular ECI physical function resides on, data identifying a set of registers that are available for use by a particular ECI physical function, data describing the type of ECI physical function that the ECI physical function configuration corresponds to, and so on.

In the example of FIG. 1, configuring vital product data (214) to include an ECI physical function configuration is carried out during run-time of the computing system (212). Run-time of the computing system (212), as the phrase is used here, refers to the period in time at which the computing system (212) has been fully booted. In the example of FIG. 1, configuring vital product data (214) to include an ECI physical function configuration may be carried out during run-time of the computing system (212), for example, by storing the ECI physical function configuration in data storage that includes the vital product data (214). Such data storage may include, for example, system admin space in which vital product data (214) is stored and used to configure an ECI device (222) when the computing system (212) boots up.

In the example of FIG. 1, the ECI device configuration manager (202) can also retrieve, upon a subsequent startup of the computing system (212), the ECI physical function configuration from the vital product data (214). In the example of FIG. 1, the ECI physical function configuration is retrieved upon a subsequent startup of the computing system (212). A subsequent startup of the computing system (212), as the phrase is used here, refers to a startup of the computing system (212) that occurs after the vital product data (214) has been configured to include the ECI physical function configuration. A startup of the computing system (212) can include the initiation of a boot sequence in which an operating system and hardware devices of the computing system (212) are initialized and configured. In the example of FIG. 1, because vital product data (214) has been configured (204) to include the ECI physical function configuration, when a subsequent startup of the computing system (212) occurs, the ECI physical function configuration can be retrieved from the vital product data (214) for use in configuring the ECI device (222) and the ECI physical functions supported by the ECI device (222).

In the example of FIG. 1, the ECI device configuration manager (202) can also configure a physical function of the ECI device (222) to carry out the type of ECI physical function described in the ECI physical function configuration. In the example of FIG. 1, the ECI physical function configuration may include information identifying the particular physical function that an ECI device (222) is to carry out. The information contained in the ECI physical function configuration that identifies the particular physical function that an ECI device is to carry out may be embodied as a particular value in the ECI physical function configuration that is mapped to a particular physical function. For example, the ECI physical function configuration may include a value in an ECI physical function field that indicates that a particular ECI device (222) is to operate as an Ethernet adapter, a Fibre Channel adapter, a FCOE adapter, a Serial Attached SCSI ('SAS') adapter, and so on. Configuring a physical function of the ECI device (222) to carry out the type of ECI physical function described in the ECI physical function configuration may therefore be carried out by extracting information in the ECI physical function configuration and inserting the extracted information into the configuration space for the ECI device (222) that is used to control the operation of the ECI device (222). Such configuration space for the ECI device (222) may include information identifying the particular port that a physical function is assigned to, an identifier for the physical function itself, and so on.

Also stored in RAM (168) is an operating system (154). Operating systems useful configuring ECI physical functions on an ECI device (222) in a computing system (212) according to embodiments of the present invention include UNIX™, Linux™, Microsoft XP™, AIX™, IBM's i5/OS™, and others as will occur to those of skill in the art. The operating system (154), ECI device configuration manager (202), and vital product data (214) in the example of FIG. 1 are shown in RAM (168), but many components of such software typically are stored in non-volatile memory also, such as, for example, on a disk drive (170), in flash memory (134) that includes firmware (136), and so on.

The computing system (212) of FIG. 1 includes disk drive adapter (172) coupled through expansion bus (160) and bus adapter (158) to processor (156) and other components of the computing system (212). Disk drive adapter (172) connects non-volatile data storage to the computing system (212) in the form of disk drive (170). Disk drive adapters useful in computers for configuring ECI physical functions on an ECI device (222) in a computing system (212) according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (212) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (212) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computing system (212) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for configuring ECI physical functions on an ECI device (222) in a computing system (212) according to embodiments of the present invention include modems for wired dial-up communications, Ethernet (IEEE 802.3) adapters for wired data communications network communications, and 802.11 adapters for wireless data communications network communications.

Figure 2:
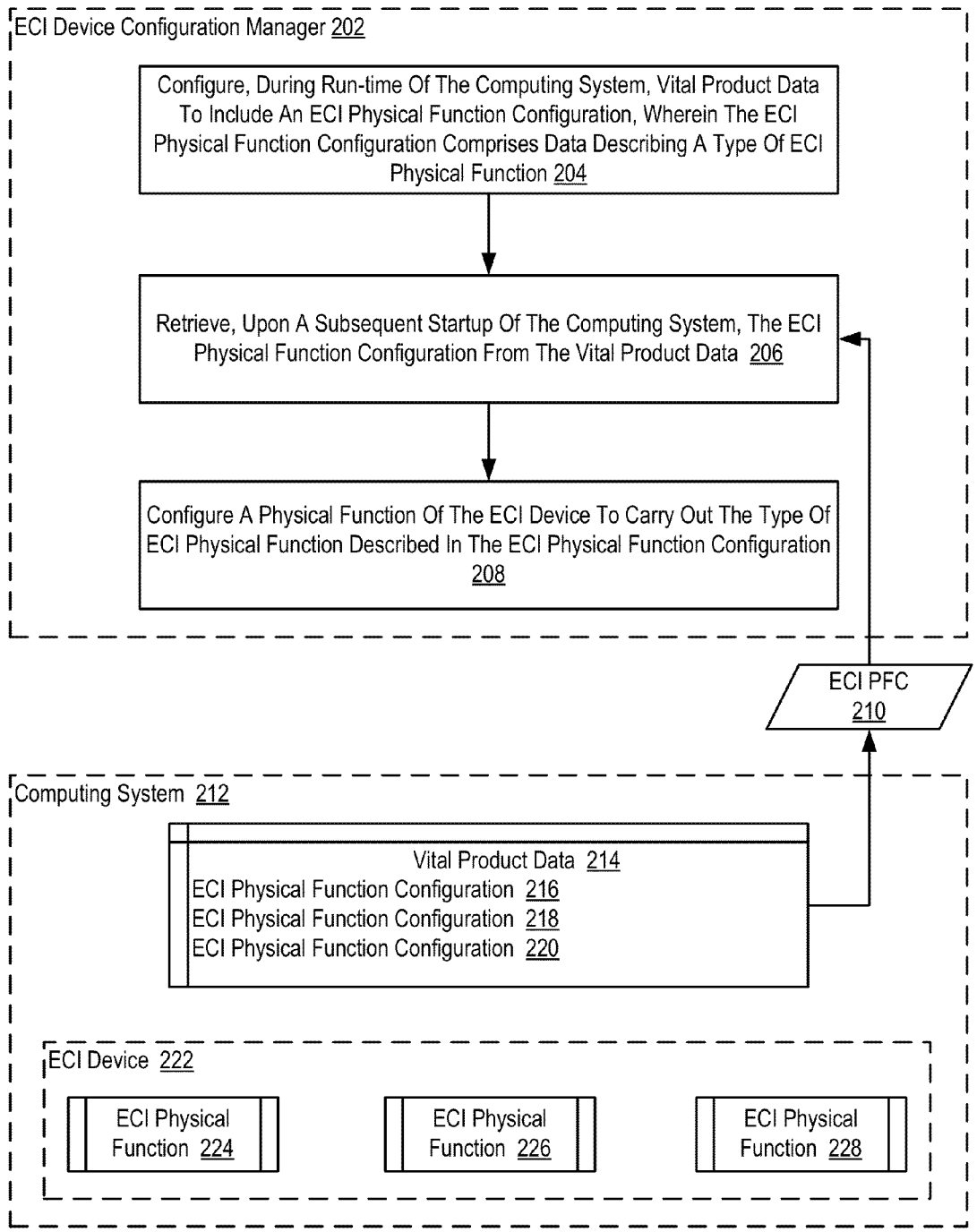
FIG. 2 sets forth a flow chart illustrating an example method for configuring ECI physical functions on an ECI device in a computing system according to embodiments of the present invention.

For further explanation, FIG. 2 sets forth a flow chart illustrating an example method for configuring ECI physical functions (224, 226, 228) on an ECI device (222) in a computing system (212) according to embodiments of the present invention. In the example method of FIG. 2, an ECI device (222) is an expansion card that is inserted into a computing system (212) to expand the functionality of the computing system (212). The ECI device (222) may be inserted into the computing system (212), for example, by inserting the ECI device (222) into an expansion slot of the computing system (212). Such an expansion slot may include electrical contacts that can be used to establish an electrical connection between the ECI device (222) and a motherboard or a backplane of the computing system (212). In the example of FIG. 2, an ECI device (222) may adhere to a predefined standard for expansion cards. For example, the ECI device (222) of FIG. 2 may be embodied as a PCIe expansion card, a PCI expansion card, a PCI-X expansion card, and so on.

In the example method of FIG. 2, each ECI device (222) may be configured to support one or more ECI physical functions (224, 226, 228). In the example of FIG. 2, a physical function (224, 226, 228) is similar to any traditional expansion card function. A physical function (224, 226, 228) is discovered, managed, and manipulated like any other expansion card. A physical function (224, 226, 228) also has full configuration resources, a completely independent set of registers, and so on such that it is possible to control an expansion card via the physical functions (224, 226, 228). The ECI physical functions (224, 226, 228) are distinguished from virtual functions, which do not have direct access to the underlying hardware resources. In the example of FIG. 2, such physical functions (224, 226, 228) may enable the ECI device (222) to operate in a variety of ways such as, for example, as an IP adapter, as a SCSI adapter, as a FCoE adapter, and so on.

The example method of FIG. 2 includes configuring (204) vital product data (214) to include an ECI physical function configuration (216, 218, 220). In the example of FIG. 2, vital product data (214) is data describing various attributes of the ECI device (222). Vital product data (214) may include, for example, a part number for the ECI device (222), a serial number for the ECI device (222), details related to the hardware configuration of the ECI device (222), levels of the hardware on the ECI device (222), firmware and software component levels on the ECI device (222), and so on.

In the example of FIG. 2, an ECI physical function configuration (216, 218, 220) is embodied as data describing the configuration of a particular ECI physical function (224, 226, 228) on the ECI device (222). An ECI physical function configuration (216, 218, 220) may include, for example, data identifying the particular port that a particular ECI physical function (224, 226, 228) resides on, data identifying a set of registers that are available for use by a particular ECI physical function (224, 226, 228), data describing the type of ECI physical function (224, 226, 228) that the ECI physical function configuration (216, 218, 220) corresponds to, data identifying a port protocol, and so on.

In the example method of FIG. 2, configuring (204) vital product data (214) to include an ECI physical function configuration (216, 218, 220) is carried out during run-time of the computing system (212). Run-time of the computing system (212), as the phrase is used here, refers to the period in time at which the computing system (212) has been fully booted. In the example of FIG. 2, configuring (204) vital product data (214) to include an ECI physical function configuration (216, 218, 220) may be carried out during run-time of the computing system (212), for example, by storing the ECI physical function configuration (216, 218, 220) in data storage that includes the vital product data (214). Such data storage may include, for example, system admin space in which vital product data (214) is stored and used to configure an ECI device (222) when the computing system (212) boots up.

In the example method of FIG. 2, configuring (204) vital product data (214) to include an ECI physical function configuration (216, 218, 220) is carried out by an ECI device configuration manager (202). In the example method of FIG. 2, the ECI device configuration manager (202) may be embodied as a module of computer program instructions improved for configuring ECI physical functions on an ECI device (222) in a computing system (212) according to embodiments of the present invention. The ECI device configuration manager (202) may reside within the computing system (212) itself, including residing within a baseboard management controller ('BMC') in the computing system (212). A BMC is a built-in system component in most blade centers that provides clients with remote management capabilities, including comprehensive monitoring and troubleshooting capabilities.

The example method of FIG. 2 also includes retrieving (206), by the ECI device configuration manager (202), the ECI physical function configuration (210) from the vital product data (214). In the example method of FIG. 2, the ECI physical function configuration (210) is retrieved (206) upon a subsequent startup of the computing system (212). A subsequent startup of the computing system (212), as the phrase is used here, refers to a startup of the computing system (212) that occurs after the vital product data (214) has been configured (204) to include the ECI physical function configuration (216, 218, 220). A startup of the computing system (212) can include the initiation of a boot sequence in which an operating system and hardware devices of the computing system (212) are initialized and configured. In the example method of FIG. 2, because vital product data (214) has been configured (204) to include the ECI physical function configuration (216, 218, 220), when a subsequent startup of the computing system (212) occurs, the ECI physical function configuration (216, 218, 220) can be retrieved (206) from the vital product data (214) for use in configuring the ECI device (222) and the ECI physical functions (224, 226, 228) supported by the ECI device (222).

The example method of FIG. 2 also includes configuring (208), by the ECI device configuration manager (202), a physical function (224, 226, 228) of the ECI device (222) to carry out the type of ECI physical function described in the ECI physical function configuration (216, 218, 220). In the example method of FIG. 2, the ECI physical function configuration (216, 218, 220) may include information identifying the particular physical function that an ECI device (222) is to carry out. The information contained in the ECI physical function configuration (216, 218, 220) that identifies the particular physical function that an ECI device is to carry out may be embodied as a particular value in the ECI physical function configuration (216, 218, 220) that is mapped to a particular physical function. For example, the ECI physical function configuration (216, 218, 220) may include a value in an ECI physical function field that indicates that a particular ECI device (222) is to operate as an Ethernet adapter, a Fibre Channel adapter, a FCOE adapter, a SAS adapter, and so on. Configuring (208) a physical function (224, 226, 228) of the ECI device (222) to carry out the type of ECI physical function described in the ECI physical function configuration (216, 218, 220) may therefore be carried out by extracting information in the ECI physical function configuration (216, 218, 220) and inserting the extracted information into the configuration space for the ECI device (222) that is used to control the operation of the ECI device (222). Such configuration space for the ECI device (222) may include information identifying the particular port that a physical function is assigned to, an identifier for the physical function itself, and so on.

Figure 3:
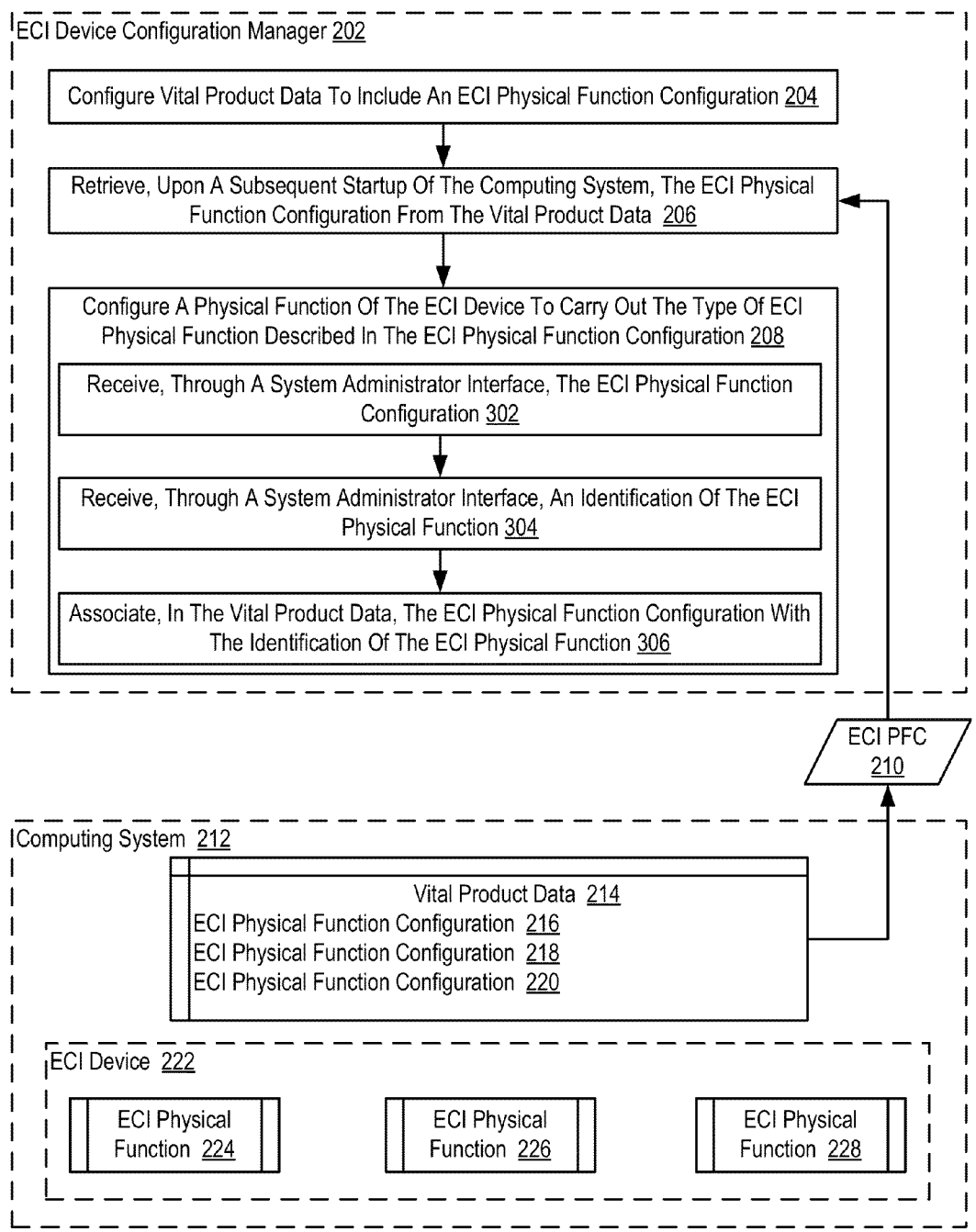
FIG. 3 sets forth a flow chart illustrating an example method for configuring ECI physical functions on an ECI device in a computing system according to embodiments of the present invention.

For further explanation, FIG. 3 sets forth a flow chart illustrating an example method for configuring ECI physical functions (224, 226, 228) on an ECI device (222) in a computing system (212) according to embodiments of the present invention. The example of FIG. 3 is similar to the example of FIG. 2 as it also includes configuring (204) vital product data (214) to include an ECI physical function configuration (216, 218, 220), retrieving (206) the ECI physical function configuration (216, 218, 220) from the vital product data, and configuring (208) a physical function (224, 226, 228) of the ECI device (222) to carry out the type of ECI physical function described in the ECI physical function configuration (216, 218, 220).

In the example of FIG. 3, configuring (208) vital product data (214) to include an ECI physical function configuration (216, 218, 220) also includes receiving (302), through a system administrator interface, the ECI physical function configuration (216, 218, 220). In the example of FIG. 3, the system administrator interface may be embodied as a user interface through which a system administrator can control configuration and operational aspects of an ECI device (222). The system administrator interface may enable the system administrator to upload predefined ECI physical function configurations (216, 218, 220) into the computing system. Alternatively, the system administrator interface may also present an ECI physical configuration building tool to the system administrator to enable the system administrator to enter information into the system administrator interface that will be used to construct ECI physical function configurations (216, 218, 220).

In the example of FIG. 3, configuring (208) vital product data (214) to include an ECI physical function configuration also includes receiving (304), through a system administrator interface, an identification of the ECI physical function. In the example of FIG. 3, receiving (304) an identification of the ECI physical function may be carried out by extracting an identifier for the ECI physical function that is contained in a predefined ECI physical function configuration (216, 218, 220). Receiving (304) an identification of the ECI physical function (224, 226, 228) may alternatively be carried out by present an interface to the system administrator through which the system administrator may enter a value to be used as the identification of the ECI physical function.

In the example of FIG. 3, configuring (208) vital product data (214) to include an ECI physical function configuration also includes associating (306), in the vital product data (214), the ECI physical function configuration (216, 218, 220) with the identification of the ECI physical function (224, 226, 228). In the example method of FIG. 3, associating (306) the ECI physical function configuration (216, 218, 220) with the identification of the ECI physical function (224, 226, 228) may be carried out, for example, by including the identification of the ECI physical function (224, 226, 228) in the ECI physical function configuration (216, 218, 220).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of configuring expansion component interconnect ('ECI') physical functions on an ECI device in a computing system, the method comprising:
configuring by an ECI device configuration manager, during run-time of the computing system, vital product data to include an ECI physical function configuration, wherein the ECI physical function configuration comprises data describing a type of ECI physical function and data identifying a particular port that a particular ECI physical function resides on;
retrieving by an ECI device configuration manager, upon a subsequent startup of the computing system, the ECI physical function configuration from the vital product data; and
configuring, by an ECI device configuration manager, a physical function of the ECI device to carry out the type of ECI physical function described in the ECI physical function configuration.

2. The method of claim 1 wherein configuring vital product data to include an ECI physical function configuration includes:
receiving, through a system administrator interface, the ECI physical function configuration;
receiving, through a system administrator interface, an identification of the ECI physical function; and
associating, in the vital product data, the ECI physical function configuration with the identification of the ECI physical function.

3. The method of claim 1 wherein the ECI device is a Peripheral Component Interconnect Express ('PCIe') device and the ECI physical function is a PCIe physical function.

4. The method of claim 3 wherein the vital product data is stored in PCIe configuration space for the PCIe device.

5. The method of claim 1 wherein the ECI device is a Peripheral Component Interconnect ('PCI') device and the ECI physical function is a PCI physical function.

6. The method of claim 1 wherein the ECI device configuration manager is a baseboard management controller ('BMC').

7. An apparatus for configuring Peripheral Component Interconnect Express ('PCIe') physical functions, the apparatus comprising an ECI device, a computer processor, a computer memory operatively coupled to the computer processor, the computer memory having disposed within it computer program instructions that, when executed by the computer processor carry out the steps of:
configuring by an ECI device configuration manager, during run-time of the computing system, vital product data to include an ECI physical function configuration, wherein the ECI physical function configuration comprises data describing a type of ECI physical function and data identifying a particular port that a particular ECI physical function resides on;
retrieving by an ECI device configuration manager, upon a subsequent startup of the computing system, the ECI physical function configuration from the vital product data; and
configuring, by an ECI device configuration manager, a physical function of the ECI device to carry out the type of ECI physical function described in the ECI physical function configuration.

8. The apparatus of claim 7 wherein configuring vital product data to include an ECI physical function configuration includes:
receiving, through a system administrator interface, the ECI physical function configuration;
receiving, through a system administrator interface, an identification of the ECI physical function; and
associating, in the vital product data, the ECI physical function configuration with the identification of the ECI physical function.

9. The apparatus of claim 7 wherein the ECI device is a Peripheral Component Interconnect Express ('PCIe') device and the ECI physical function is a PCIe physical function.

10. The apparatus of claim 9 wherein the vital product data is stored in PCIe configuration space for the PCIe device.

11. The apparatus of claim 7 wherein the ECI device is a Peripheral Component Interconnect ('PCI') device and the ECI physical function is a PCI physical function.

12. The apparatus of claim 7 wherein the ECI device configuration manager is a baseboard management controller ('BMC').

13. A computer program product for configuring expansion component interconnect ('ECI') physical functions on an ECI device in a computing system, the computer program product disposed upon a computer readable storage medium, the computer program product comprising computer program instructions that, when executed, cause a computer to carry out the steps of:
- configuring by an ECI device configuration manager, during run-time of the computing system, vital product data to include an ECI physical function configuration, wherein the ECI physical function configuration comprises data describing a type of ECI physical function and data identifying a particular port that a particular ECI physical function resides on;
- retrieving by an ECI device configuration manager, upon a subsequent startup of the computing system, the ECI physical function configuration from the vital product data; and
- configuring, by an ECI device configuration manager, a physical function of the ECI device to carry out the type of ECI physical function described in the ECI physical function configuration.

14. The computer program product of claim 13 wherein configuring vital product data to include an ECI physical function configuration includes:
- receiving, through a system administrator interface, the ECI physical function configuration;
- receiving, through a system administrator interface, an identification of the ECI physical function; and
- associating, in the vital product data, the ECI physical function configuration with the identification of the ECI physical function.

15. The computer program product of claim 13 wherein the ECI device is a Peripheral Component Interconnect Express ('PCIe') device and the ECI physical function is a PCIe physical function.

16. The computer program product of claim 15 wherein the vital product data is stored in PCIe configuration space for the PCIe device.

17. The computer program product of claim 13 wherein the ECI device is a Peripheral Component Interconnect ('PCI') device and the ECI physical function is a PCI physical function.

18. The computer program product of claim 13 wherein the ECI device configuration manager is a baseboard management controller ('BMC').

\* \* \* \* \*